Jan. 19, 1943. E. B. NICHOLS 2,308,710
RECORDING MEASURING INSTRUMENT
Filed April 29, 1940 2 Sheets-Sheet 1
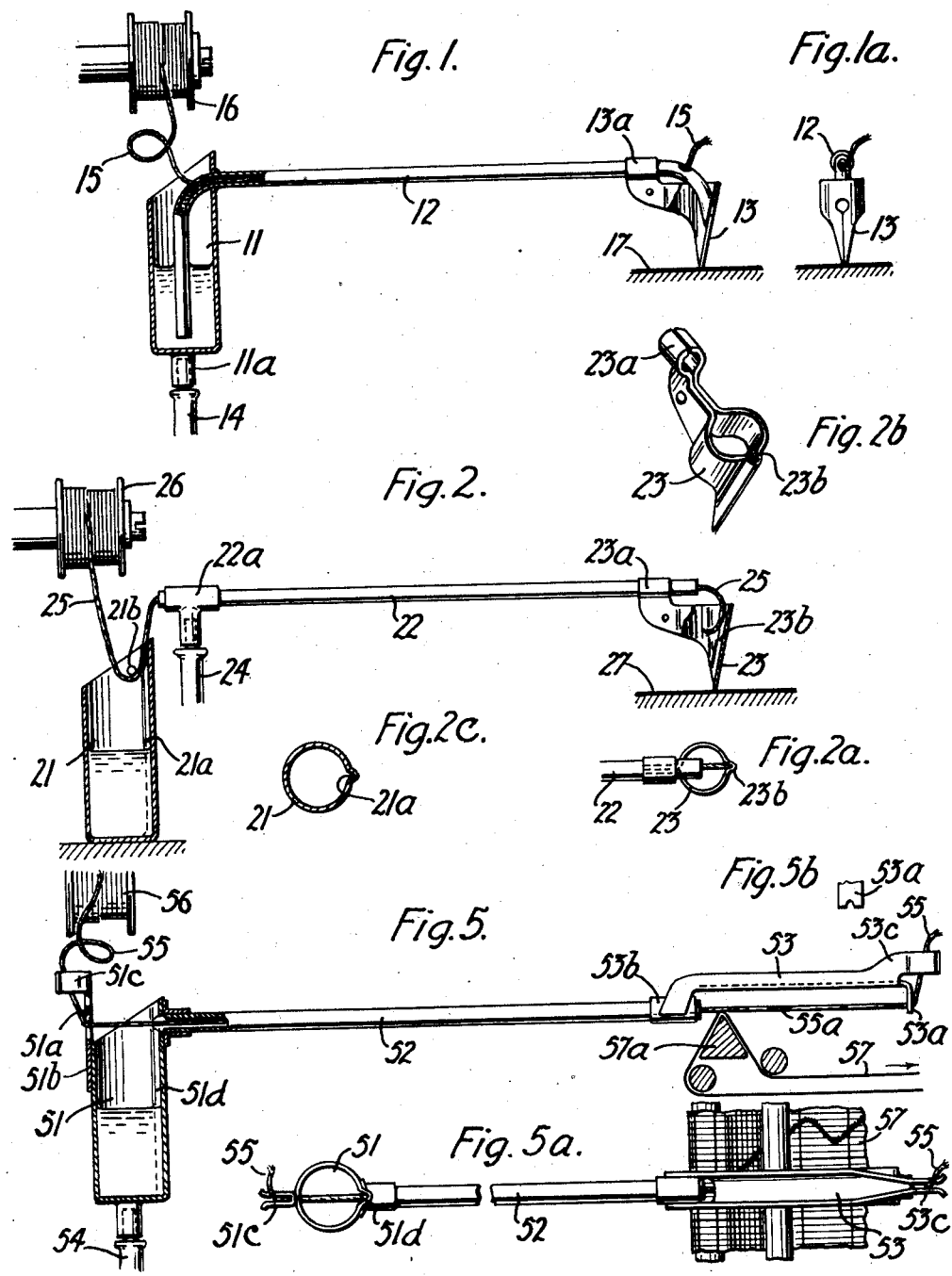
Inventor:
Edgar B. Nichols

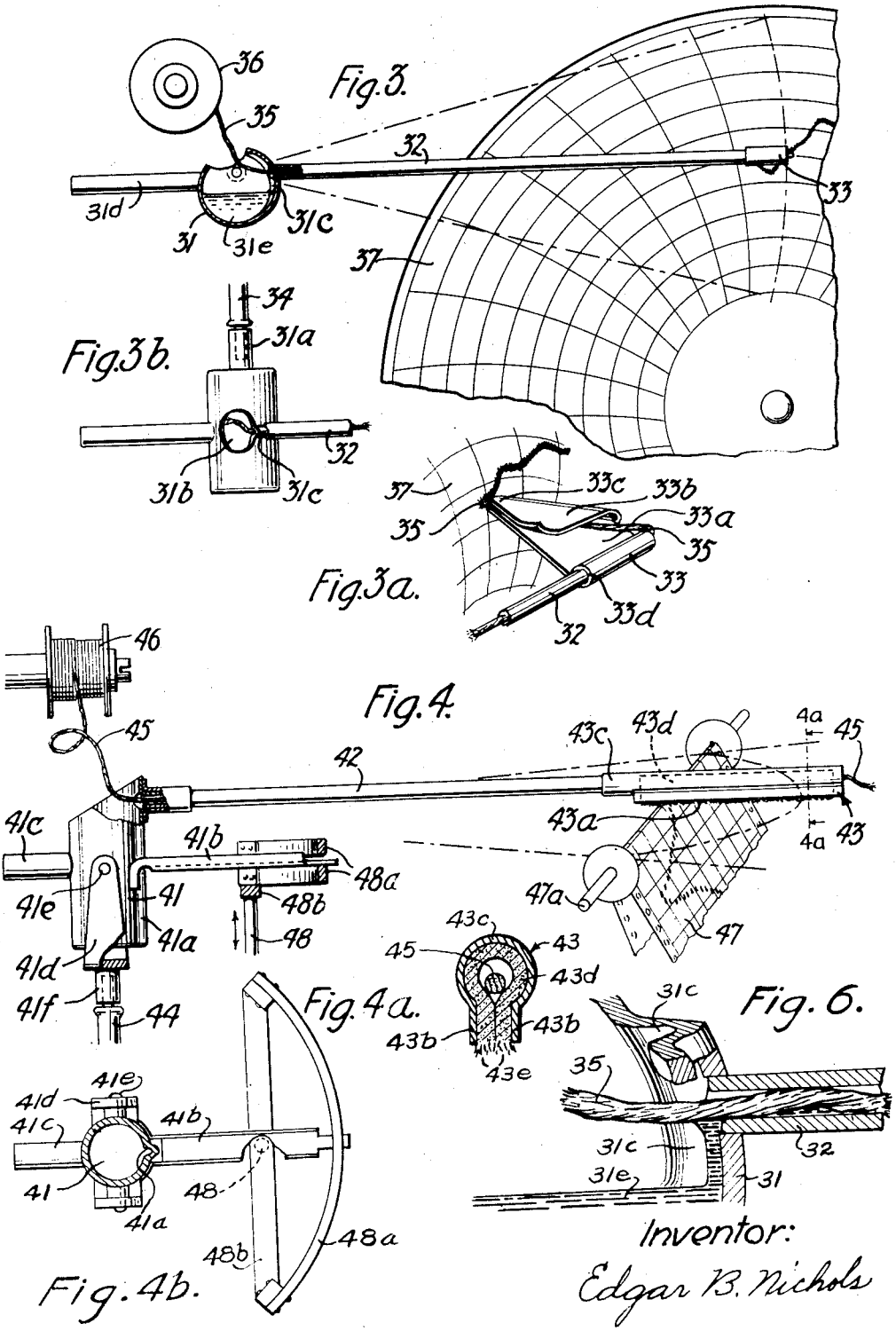

Patented Jan. 19, 1943

2,308,710

UNITED STATES PATENT OFFICE 2,308,710

RECORDING MEASURING INSTRUMENT

Edgar B. Nichols, Moorestown, N. J., assignor to Nichols Products Company, Moorestown, N. J., a corporation of New Jersey Application April 29, 1940, Serial No. 332,402

13 Claims. (Cl. 234—73)

The invention relates to recording measuring instruments and particularly to the recording elements and the inking system for instruments of this type.

Measuring instruments, responsive to varying quantities of widely different kinds for making records of the variations in those quantities have been designed for recording in different manners, and in certain types of these instruments an inking system is provided for recording with ink on a medium, such as paper, which may be in the form of a revolving disc or a long continuous strip. The instruments are frequently placed at distant or comparatively inaccessible locations so that it becomes desirable to arrange them for continuous operation over very long periods, say, of several weeks, without attendance.

It is, therefore, an object of the invention to provide a recording and inking system for instruments of this type that will be capable of reliable continuous functioning for long periods of time without attendance.

It is a further object of the invention to provide an inking system which is not likely to clog and which can readily be cleaned and refilled with ink without the need for disassembling the instrument or even the inking system in the field.

It is a still further object of the invention to provide a recording and inking system which is simple in construction and reliable in operation and which requires a minimum of servicing.

It is a more specific object to provide an inking system adapted for recording upon a vertical surface without blotching the record.

In accordance with the invention the measuring equipment of the instrument may be of any type and may be responsive to any kind of varying quantity, and the recording element is in the nature of a pointer or instrument arm, attached for movement over a suitable scale to a suitable extension of the moving system in the instrument.

In accordance with a feature of the invention the instrument arm or pointer has a tubular stem reaching from the point of pivot to the point of recording, attached at the pivoted end in a suitable manner to the moving element of the instrument and carrying at the recording end a suitable writing element or pen point for engagement with the record paper. A suitable ink well is provided near the pivoted end of the stem for supplying ink through the moving hollow stem to the writing element. A strand of any suitable material, but preferably composed of a plurality of inter-twisted filaments, is threaded through the hollow stem, leading from a strand supply, such as a spool with turns of strand wound thereon, to the writing element. By such an arrangement the end of the strand at the writing element may be grabbed for pulling the strand through the stem to be replaced by a new length of strand from the supply, so that any dry ink on the strand or within the stem may be removed from the stem by the passing of the strand therethrough; after enough strand has been pulled through to insure that the system has been properly cleaned, the excess length of strand may be cut off. The strand may be composed of filaments of glass, of metal wire not corroded by the ink, of textile fibres or of any other suitable material.

In accordance with a more specific feature of the invention, the capillary action of the strand is taken advantage of to feed the ink from the ink well through the hollow stem to the writing element independently of any capillary action of the stem. For this purpose the strand is passed from the spool and through the ink well in such a manner that it will be in contact with the ink at a point just before its entrance into the stem. Provision is made for supplying ink to the strand independently of the surface level of the decreasing ink supply in the well; thus a capillary lead is provided which extends from the bottom of the well to a point above the highest ink level and the strand is placed to receive ink from an upper part of this lead immediately before it enters the stem.

At the writing element the other end of the strand may be placed in engagement with a capillary lead of the writing element to feed ink through the capillary action of the writing element to the recording surface or, in accordance with an alternative feature, the strand may be fastened in the writing element which places a portion of the strand in engagement with the recording surface for supplying ink directly to the record.

In accordance with still another feature of the invention a capillary lead is provided which is formed as a substantially V shaped groove in the wall of the ink carrying element, such as an ink well or a recording pen. Such a groove will provide a satisfactory capillary action near the bottom of the V and has been found to be capable of a considerable lift of liquid, depending of course upon the volatility of the liquid and the presence of protecting vapors. The groove has been found to offer important advantages over tubular leads or slotted leads, such as the well known slot in writing pens, in that the ink rarely dries in the very bottom of the groove and thus always finds a passage, and in that the groove is open along the entire length of the lead and therefore may easily be inspected and cleaned at any point.

The invention is readily adaptable for recording with ink on a horizontal record surface and especially on a vertical record surface, in which latter case the common trouble of excessive ink supply with resulting blotching of the record may be entirely avoided. The invention furthermore is adaptable for recording along curved lines or along straight lines, i. e. for recording on record paper with curved ruling or with straight line ruling.

These and other features and advantages of the invention will be more apparent from a study of the following description and the attached drawings, in which are disclosed a few specific embodiments of the invention as typical examples of different forms and combinations of the various features.

Thus, in the drawings

Figs. 1 and 1a, show a recording inking system using a hollow stem and a cleaning thread therethrough;

Figs. 2, 2a, 2b and 2c show a similar system utilizing the capillary action of the thread for supplying ink from a capillary groove in the ink well to a capillary groove in the recording pen;

Figs. 3, 3a and 3b show a similar system in which the recording pen is arranged to place the thread in contact with the recording paper for direct application of ink to the paper which is placed in a vertical plane;

Figs. 4, 4a and 4b show a similar system particularly adapted for straight line recording, and in which a wick or mat is provided in the pen for applying the ink from the thread to the record paper having straight line ruling; and Figs. 5, 5a and 5b show a system similar to that of Fig. 4 but in which the thread supplies the ink directly to the record paper; and Fig. 6 is an enlarged sectional view of the juncture between pointer and ink container as in the embodiment shown in Fig. 3.

Referring now to Fig. 1, the inking system comprises an ink well 11, a recording pen 13 and a hollow pointer stem 12. The ink well 11 has a deep cylindrical shape closed at the bottom; the top is open and is cut down on one side to permit threading the strand 15 into the stem 12 at a point inside the well. The stem 12 is formed of a tube of small diameter to provide capillary action. The stem is passed through the wall of the well and is fastened thereto in any convenient manner, as by soldering. Inside the well the stem tube is bent downward to reach nearly to the bottom of the well. The stem 12 extends substantially straight and at right angle from the well and carries at the other end a bracket 13a of the pen 13. Beyond the bracket 13a the stem tube is bent downward at an oblique angle and the end of the tube is cut off at an angle and is carefully shaped to fit close to the inner curved surface of the pen 13. The pen 13 has a conventional slotted writing point and is formed with two extensions shaped into the bracket 13a fitting about the stem 12 for adjustment of the pen close to the shaped end of tube 12.

The elements so far described thus form a rigid system adapted to serve as a recording pointer for any type of measuring instrument. For this purpose the system is pivoted about the vertical axis of the ink well and the writing point describes an arc on the horizontal recording surface 17.

The ink well has a sleeve-like extension 11a attached to its bottom and adapted to fit tightly to the operating member 14 from the moveable system of the measuring instrument, not shown. Angular movement of the member 14 about its vertical axis thus causes the ink well to turn about its axis, carrying with it the stem 12 and the point 13.

The record surface 17 may be a sheet of paper, such as a circular record disc or a strip from a record roll, and the paper is kept constantly in motion past the pen by any conventional means.

Ink is raised from the supply in the well 11 by the capillary action of the vertical portion of stem tube 12 to the horizontal portion of the stem from which it is in turn withdrawn by the capillary action of the pen slot, engaging the outer end of the stem tube, as ink is being continuously withdrawn by the moving record.

For easy cleaning of the long thin tube 12, the stem has an opening through its wall at each end for passing of the thread 15 through its interior. The thread 15 is loosely led from a spool 16 mounted for free rotation by any convenient means such as a screw through its center, and the thread is entered through the stem opening within the well and pushed through the stem until it extends beyond the opening in the stem at the pen. By providing slack in the thread between the well and the spool 16 it is prevented that the thread interfere with the movements of the inking system.

When the occasion arises the horizontal portion of stem 12 may be simply and effectively cleaned without disconnecting the stem from the well or the pen by grabbing the free end of the thread at the pen and pulling enough thread through the stem to insure that all dry ink has been removed. The excess thread is then cut off and the slack at the well is restored, whereupon the inking system is ready for further operation.

Referring now to the embodiment illustrated in Fig. 2 the stem 22 is mounted directly upon the operating member 24 from the measuring instrument, and the ink well 21 does not form part of the moving system but is placed on a rigid support close by the member 24. The pen 23 is fastened at the free end of stem 22 substantially as in Fig. 1.

The stem tube is substantially straight from end to end, and is mounted at the pivot point in a suitable fitting 22a having a downward extension adapted to fit tightly on an extension of the driving member 24 for ready detachment therefrom.

A strand 25 leading from a supply spool 26 is passed through the length of the stem 22 and is adapted to be pulled through the stem when it becomes desirable to clean the stem, as described for Fig. 1.

However, in the embodiment of Fig. 2 the strand serves the second purpose of supplying ink by capillary action from the well to the pen. In this arrangement the ink well has in one side a vertical groove 21a formed directly in its wall. The groove is substantially V shaped with the open side facing the interior of the well, as shown more clearly in the cross sectional view Fig. 2c.

of the well. The groove extends from the bottom of the well to near the top thereof and, due to the fairly sharp bottom of the groove, a capillary effect is secured whereby the ink may be lifted along the bottom of the groove from any level of the ink to a point near the upper edge of the well where the strand 25 is placed in engagement with the groove. During the movements of the stem 22 the strand may be held in place in the groove by any convenient means, such as a cross-bar 21b fastened in the wall of the well 21, as by soldering. Thus the strand being in engagement with the ink in the groove 21a will by its capillary action further raise the ink to the height of the stem 22 and will pass the ink along the interior of stem 22 to the pen 23.

The pen 23 has, instead of the conventional slot, a capillary groove 23b, similar to groove 21a; the shape of the pen with its clamping bracket 23a and groove 23b is shown more clearly in the perspective view 2b.

The thread 25 as it leaves the tube 22 is bent downward to have its end portion lie in the groove 23b of the pen so that the ink will pass from the thread into the groove and, by the capillary action of the groove, to the continuously passing record surface 27.

It will be noted that in the arrangement of Fig. 2 the ink carrying thread is exposed to the air only at two very short pieces, namely, between the well and the stem and between the stem and the pen so that evaporation from the thread and consequent clogging of the system are reduced to a practical minimum.

The inking and recording system shown in Fig. 3 is especially adapted for operation with a vertically disposed record surface. Thus the operating member 34 from the instrument pivots about a horizontal axis and the record surface 37 is that of a disc mounted for continuous rotation about a horizontal axis.

The ink well 32 is again of cylindrical shape placed horizontally with closed ends; the extension 31a for mounting on the operating member 34 is attached to one closed end above the center thereof, and an opening 31b for filling with ink is cut midway of the cylindrical wall and on the upper side thereof. A counter weight 31d, of any convenient construction, for balancing the weight of the stem and the pen may be attached in any convenient manner to one side of the well 31.

The stem tube 32 is attached midway of the cylindrical wall and on one side thereof for movement therewith, and carries at its free end the pen 33, shown more in detail in the perspective view Fig. 3a.

A capillary V shaped groove 31c is formed in the cylindrical wall of the well 31 from the bottom of the well to the point at which the stem enters the well.

A fibrous thread 35 from a supply spool 36 is fed through the opening of the well and into the stem, emerging at the free end of the stem.

The pen 33 is formed of sheet metal into a triangular clamp having two opposed wings 33a and 33b and terminating near the record in a channel-shaped point 33c; the pen has a cylindrical portion 33d adapted to fit on to the end portion of the stem tube 32.

After the thread 35 has been threaded through the tube 32 the end is grabbed and pulled out sufficiently to be laid into the clamp and the channel shaped point 33c of pen 33. The thread is then cut off clean fairly close to the point 33c, with only enough thread protruding to form a writing mat against the record surface for feeding ink to the record.

The thread picks the ink up from the ink filled capillary groove 31c in the ink well and feeds it through the stem to the pen.

It will be noted that due to the capillary feeding of the ink through the thread in the pen independently of gravity the pen may be pointed at a right angle to the record surface and thus will write equally well whether the pen moves upward or downward on the record.

The stem may be cleaned and the writing point of the thread may be renewed and reshaped each time the record disc is renewed by grabbing the free portion between the stem and the pen clamp, say, with a pair of pinchers, and pulling it out of the clamp and the stem. The new portion of thread is readily placed in the clamp and trimmed.

Fig. 4 shows an application of the invention to a measuring instrument with a pivoted pointer for straight line recording.

In this arrangement the stem tube 42 is attached to the vertical cylindrical well 41 substantially as shown in Fig. 1, and the well is attached for angular movement to the operating member 44 from the measuring instrument.

The record paper 47 is a long strip unwound continuously from a roll and bent over an edge or rod 47a to always present a new straight-line surface to the recording pen 43.

Since the pen moves over an arc during recording it is formed to have a long horizontal writing edge 43a in continual engagement with the edge of the record. The pen is mainly shaped as a long hollow holder with two downward projecting lips 43b, and with a sleeve 43c for attachment to the stem 42. Within the holder is a writing mat 43d, bent from a piece of absorbent textile material to form a double layer, and slipped end-wise into the open-ended pen to fill substantially the whole length of the pen. The mat is opened within the pen to form a hollow center and the material extends downward to be held tight by the lips 43b. The two parallel projecting edges 43e of the mat are trimmed fairly close to the lips 43b and thus present a firm, well defined writing edge in close engagement with the record edge.

Ink is supplied from the ink well 41 having a capillary groove 41a, similar to that in the arrangement of Fig. 2, which raises the ink to the thread 45 as it enters the stem 42. It will be noted that in this arrangement, as well as in that of Fig. 3, where the well moves with the stem, the latter terminates in an opening made directly in the groove 41a so that the thread is forced to pass through the capillary bottom of the groove as it enters the tube 42 thereby making certain contact with the ink in the groove. The thread thus feeds the ink to the absorbent mat from which it is transferred to the record surface by the slight contact pressure. The pen and its parts, for the sake of clearness, are shown greatly enlarged and disproportioned; however, the design lends itself well to recording with sharp, distinct lines, since the mat may be of thin material and is held firmly close to its writing edge by the pen clamp.

In fact it has been found that the pen is particularly well adapted to make an intermittent record made up of a succession of close dots or dashes, each well defined. This type of recording, accomplished by a vibrating pen structure, is especially useful for highly sensitive instruments where recording of wide-angle deflections is desirable, because the pen will be only intermittently in contact with the comparatively rough record surface and the vibrations overcome the slight inherent sluggishness of the system.

With this object in view the well 41 is pivotally hung in a cradle 41d so that the well 41 and stem 42 can be oscillated through a small angle in a vertical plane about the two pivots 41e carried by an upright of the cradle on each side of the well. The cradle 41d has attached to its bottom cross-piece the extension 41f detachably fitted to the operating member 44 from the measuring instrument, the horizontal angular movements of which are imparted through the cradle 41d and the pivots 41e to the well and the pen.

The instrument has an oscillating mechanical system not shown in the drawings, which may be of any suitable design and which has an operating member represented by the rod 48. The rod 48 is continually moved up and down a short distance and at a predetermined frequency which may be fixed in relation to the speed of the record paper to provide a desired separation of the recorded dots or dashes. The rod is of course vibrated by power independent of the power supplied to the pen by the measuring system of the instrument for recording.

The rod 48 carries at its upper end two arcuated bars 48a mounted at their opposite ends on a suitable bracket or cross-piece 48b for attachment to the rod. A rigid arm 41b is attached, as by soldering, to the outside of the well 41 and has its free end shaped to enter between the oscillating bars 48a for vertically oscillating the entire inking system about the pivots 41e.

As the inking system is operated by the instrument about the axis 44 the free end of the arm 41b travels between the arcuated bars 48a and thus will always be subjected to the oscillating movements of the rod 48, and will always be oscillated through the same angle.

The inking system may be balanced fairly independently of the stand of the ink in the well by a counter-weight 41c attached to the well to reduce the weight acting on the lower bar 48a. The natural frequency of the stem and pen system should be much greater than the oscillating frequency of the rod 48 to avoid sustained vibrations of the pen. The adjustment of parts should be such that the pen in the lower position of rod 48 will touch the paper with a gentle pressure sufficient to produce a clear mark, and in the upper position of rod 48 the pen should fully clear the paper. The time spent in lower position may be but a small fraction of each oscillating period, so that the inking system will be only momentarily resisted by the paper in its measuring function. The resistance against the measuring movements of the pen by the bars 48a may be reduced to a minimum by a fair balance of the system, smoothening of the engaging surfaces on the bars and on the arm 41b and by the much shorter distance of the arched bars from the pivoting center than that of the pen. By leaving a slight clearance between the arm 41b and the bars 48a the inking system will repeatedly be entirely free for movement by the measuring instrument and, in fact, due to the oscillating movements the inking system is kept in a state of alertness which will make it highly responsive to extremely small measuring forces.

The formation of dots or dashes of desired lengths depends upon the sharpness of the linear surface presented by the record paper for engagement with the narrow mat of the pen. Thus fairly long dashes may be obtained by passing the paper 47 tightly over a cylindrical rod 47a as shown in Fig. 4, whereas, for dots a sharp edge may be used under the paper as shown at 57a in Fig. 5.

The embodiment shown in Fig. 5 is of the same general type as that shown in Fig. 4, in that it is adapted for straight-line recording on a continuous strip of paper. It may be arranged for oscillatory movement in the manner shown in Fig. 4 but is shown in Fig. 5 as having the ink well 51 attached directly to the operating member 54 from the measuring instrument.

The pen is, however, typically different from that in Fig. 4, in that the thread 55 is tightly suspended and is used to directly engage the record surface 57 for producing the ink record.

The pen is constructed with a long body portion attached at one end to a sleeve 53b for connection to the stem 52 and carrying at the other end a slotted guide piece 53a for proper location of the recording portion 55a of the thread and a clamp 53c for fixing the end of the thread.

The ink well 51 has a clamp member 51b attached to the side directly opposite the stem side for properly guiding the thread by a slotted piece 51a similar to the guide piece 53a shown in Fig. 5b and for clamping the thread on its way to spool 56 by the clamp 51c.

The guide pieces 51a and 53a are aligned with the stem 52, so that the thread is held taut in a straight line between the guides by the clamps 51c and 53c.

The well has a capillary groove 51d and the thread in passing through the groove to the stem continuously takes ink therefrom as ink is removed from the recording portion of the thread by the continuously moving record surface 57.

Fig. 6 of the drawings is a much enlarged view of the juncture between the hollow stem 32 and the container 31 of the embodiment shown in Fig. 3, and closely resembling these parts also as shown in Figs. 4 and 5. In Fig. 6 it can clearly be seen how the ink 31e is raised by the groove 31c above the surface in the container and how the strand 35 comes in contact with the ink in the upper part of the groove as it enters the stem 32.

What is claimed:

1. An instrument pointer for recording with fluid ink, movably mounted to be responsive to a varying quantity and including a hollow stem for carrying ink from an ink supply to a writing head, and a strand through said stem having one end extending beyond said stem near the writing head and leading from a supply of said strand near the ink supply.

2. A pivoted instrument pointer for recording with fluid ink, having a thin hollow stem and a writing head connected to the free end of said stem, a container of ink located near the pivoted end of said stem, and a strand through said stem extending beyond said stem near said writing head and also near said container.

3. An instrument pointer for recording with fluid ink, having a thin hollow stem and a writing head at the free end of said stem, a container of ink located near the other end of said stem, a strand supply located near the said other end of said stem, and a portion of strand from said strand supply leading through said stem and beyond said free end, said strand supply containing at least enough strand for replacement of said end portion of strand.

4. A pivoted instrument pointer for recording with fluid ink which comprises a writing head, an ink container, a wick strand for feeding ink from said container to said writing head, an elongated stem for carrying said writing head and being pivoted for moving said writing head to different recording positions, said stem being hollow and enclosing substantially the entire feeding length of said wick strand from said container to said writing head in order to reduce evaporation from said feeding length.

5. A pivoted instrument pointer for recording with fluid ink on a record surface, having a hollow stem for carrying ink from an ink supply, a strand through said stem leading from a supply of said strand near the pivot of said pointer, a writing point attached near the free end of said stem and comprising a fastener, said strand leading from said stem near the free end thereof into said fastener and being cut close to said fastener to engage said record surface and supply ink directly to the record from said stem.

6. An instrument pointer in accordance with claim 5 in which said fastener is a clip shaped to have a point for holding the cut end of said strand firmly against the record surface.

7. A pivoted instrument pointer for recording with fluid ink on an exposed straight-line portion of a record surface which comprises an elongated writing head adapted for recording on said straight-line portion with any point between two extreme points along one side of said head, a pivoted hollow stem for carrying said head and moving it to different recording positions, an ink supply near the pivoted end of said stem, a wick strand passing through said stem from said ink supply to feed ink to any recording point along said writing head.

8. A pivoted instrument pointer in accordance with claim 7 in which said elongated writing head is of thin sheet metal formed into a tubular member attached to said stem and having a slot-like opening along the side facing said record surface, said member containing a fibrous mat exposed through said slot for recording on said surface and said wick strand being in engagement with said mat within said member for supplying ink thereto, said mat being exposed through said slot along said head at least the entire distance between said two extreme points.

9. An instrument pointer for recording with fluid ink on a record surface, said pointer comprising a hollow stem for operation by an instrument, a writing head attached to said stem and a wick strand passing through said stem for feeding ink from an ink supply through said stem to the recording surface, said writing head including fastening means for the end portion of said strand to place said strand firmly in engagement with the record surface for producing the record.

10. A recording system for recording with fluid ink which comprises an operating member responsive to a varying quantity to be recorded, a recording arm connected to said member for movement thereby and having a writing head and an elongated hollow stem for carrying said writing head, a container for ink, a strand supply near said container, and an end portion of strand from said strand supply passing in contact with the ink within said container thence through said stem to said writing head to supply ink thereto from said container for recording, said strand supply containing at least enough strand for replacement of said end portion of strand.

11. A recording system in accordance with claim 10 in which said strand supply is a loosely mounted coil of strand from which lengths of strand may be readily removed, and in which said portion of strand is loosely passed through said stem to be pulled through said stem for replacement by an adjacent length of strand from said coil.

12. A recording system in accordance with claim 10 in which said container of ink has in one side a sharp bottomed capillary groove extending substantially vertically from near the bottom upward to near an edge of said container and facing the ink in said container for raising ink from the main surface of the ink, and in which said end portion of strand is guided in contact with the ink in the upper part of said capillary groove to receive ink therefrom for said writing head.

13. A recording system in accordance with claim 10 in which said writing head is of thin sheet metal formed into a point for recording and has a sharp bottomed capillary groove extending from said recording point to a point of engagement with said thread for receiving ink from said thread and feeding it to said recording point.

EDGAR B. NICHOLS.